United States Patent
Goodwin, III

(10) Patent No.: US 6,547,040 B2
(45) Date of Patent: Apr. 15, 2003

(54) SELF-SERVICE CHECKOUT SYSTEM WITH RFID CAPABILITY

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 31 days.

(21) Appl. No.: 09/824,825

(22) Filed: Apr. 2, 2001

(65) Prior Publication Data

US 2002/0139617 A1 Oct. 3, 2002

(51) Int. Cl.[7] .............................. A63F 9/02; E04H 3/04
(52) U.S. Cl. ........................................... 186/61; 186/50
(58) Field of Search .............................. 186/61, 59, 66, 186/2; 177/50, 25.15; 235/383; 340/666

(56) References Cited

U.S. PATENT DOCUMENTS

| | | | |
|---|---|---|---|
| 3,681,570 A | * 8/1972 | Abt .............................. 177/50 |
| 3,681,571 A | * 8/1972 | Strohschneider ............ 235/383 |
| 4,816,824 A | 3/1989 | Katz et al. ............. 340/825.34 |
| 5,125,465 A | * 6/1992 | Schneider ................ 177/25.15 |
| 5,151,684 A | 9/1992 | Johnsen ...................... 340/572 |
| 5,239,167 A | 8/1993 | Kipp .......................... 235/383 |
| 5,375,680 A | * 12/1994 | Ikeda et al. ................... 186/61 |
| 5,398,191 A | * 3/1995 | Komai ..................... 177/25.15 |
| 5,635,906 A | * 6/1997 | Joseph ........................ 177/264 |
| 5,662,190 A | * 9/1997 | Abe .............................. 186/61 |
| RE36,109 E | * 2/1999 | Kipp ........................... 235/383 |
| 5,898,158 A | * 4/1999 | Shimizu et al. ................ 186/61 |
| 5,987,428 A | * 11/1999 | Walter ...................... 177/25.15 |
| 5,990,794 A | * 11/1999 | Alicot et al. ................. 235/383 |
| 6,019,394 A | 2/2000 | Chenoweth et al. .......... 283/81 |
| 6,105,867 A | * 8/2000 | Shimizu et al. ................ 186/61 |
| 6,215,078 B1 | * 4/2001 | Torres et al. ............. 177/25.15 |
| 6,315,199 B1 | * 11/2001 | Ito et al. ..................... 235/383 |
| 2002/0079367 A1 | * 6/2002 | Montani ..................... 235/383 |
| 2002/0096564 A1 | * 7/2002 | Bellis, Jr. et al. ........... 235/383 |

FOREIGN PATENT DOCUMENTS

| | | | | |
|---|---|---|---|---|
| EP | 0178223 A2 | * | 4/1986 | ............ G07G/1/00 |
| EP | 0531265 A1 | * | 3/1993 | ............ A47F/9/04 |

* cited by examiner

*Primary Examiner*—Donald P. Walsh
*Assistant Examiner*—Mark J Beauchaine
(74) *Attorney, Agent, or Firm*—Paul W. Martin

(57) ABSTRACT

A self-service checkout system which weighs products with RFID labels for security. The system includes an RFID label affixed to a product, a scale for determining actual weight information for the product, and a computer which records a customer indication that the product is on the scale, transmits a signal to the RFID label while the product is on the scale, records a response from the RFID label, obtains identification information for the product using the response from the RFID label, obtains price and reference weight information for the product using the identification information, compares the actual weight information with the reference weight information, and initiates acceptance of payment if a difference amount between the actual weight information and the reference weight information is with a predetermined threshold.

5 Claims, 3 Drawing Sheets

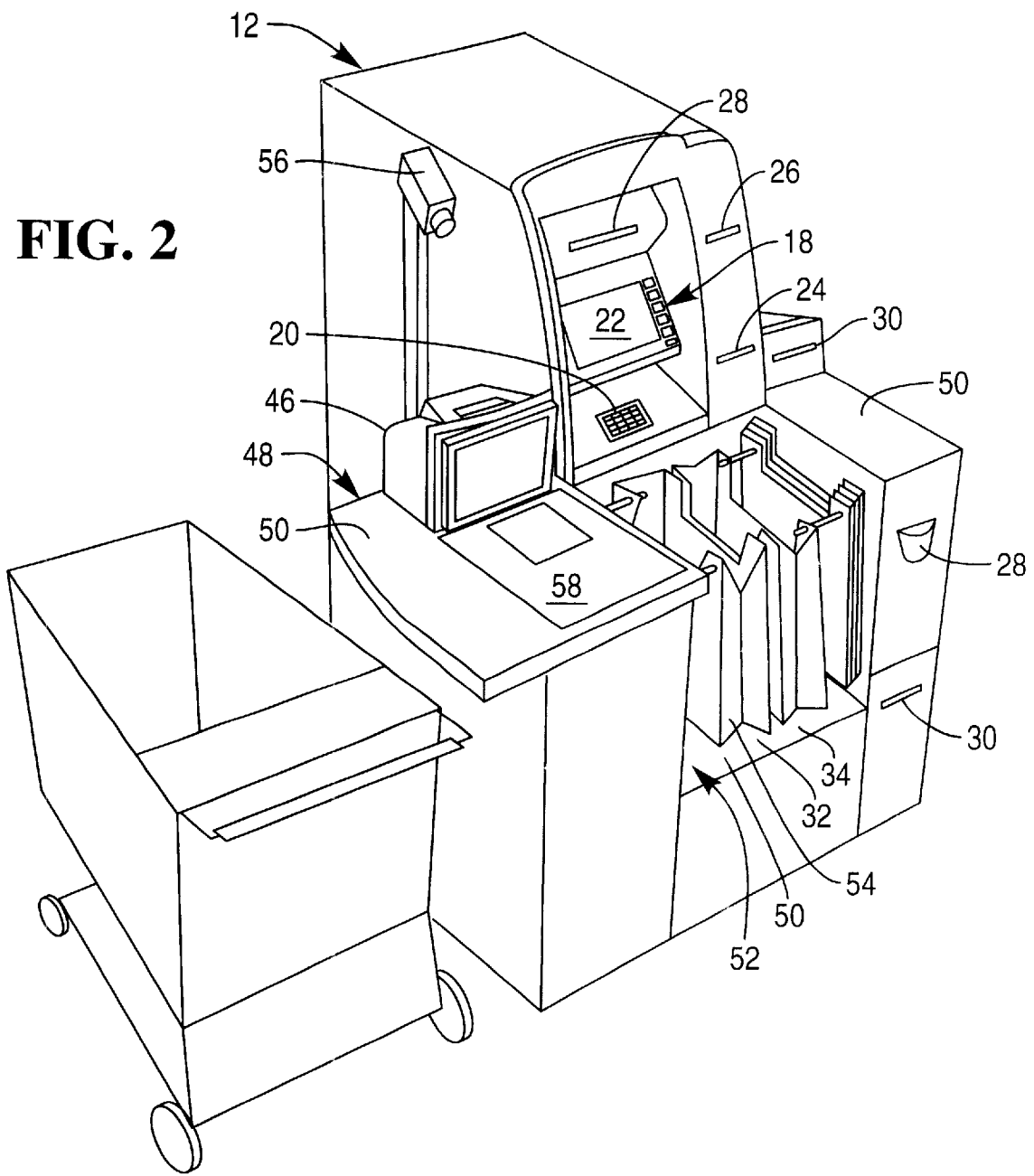

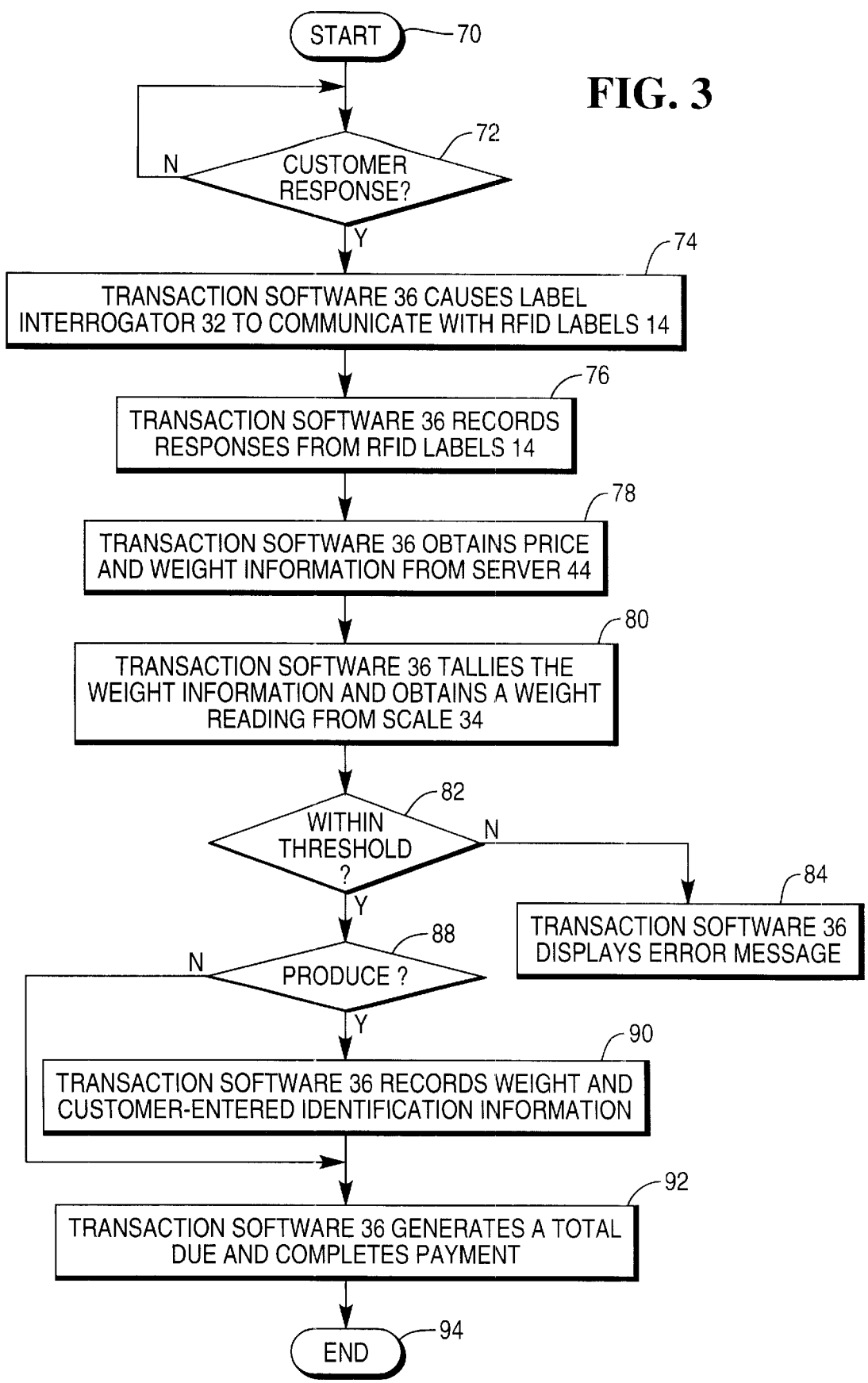

SELF-SERVICE CHECKOUT SYSTEM WITH RFID CAPABILITY

BACKGROUND OF THE INVENTION

The present invention relates to self-service checkout systems in supermarkets and other retail establishments, and more specifically to a self-service checkout system with RFID capability.

Self-checkout systems typically include similar components as full-service checkout systems. One such self-service system is disclosed in U.S. Pat. No. 5,992,570 assigned to the assignee of the present invention. This patent is hereby incorporated by reference.

Radio Frequency Identification (RFID) technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

It would be desirable to provide a self-service checkout counter with RFID capability.

SUMMARY OF THE INVENTION

In accordance with the present invention, a self-service checkout system with RFID capability is provided.

The system includes an RFID label affixed to a product, a scale for determining actual weight information for the product, and a computer which records a customer indication that the product is on the scale, transmits a signal to the RFID label while the product is on the scale, records a response from the RFID label, obtains identification information for the product using the response from the RFID label, obtains price and reference weight information for the product using the identification information, compares the actual weight information with the reference weight information, and initiates acceptance of payment if a difference amount between the actual weight information and the reference weight information is with a predetermined threshold.

It is accordingly an object of the present invention to provide a self-service checkout system with RFID capability.

It is another object of the present invention to provide a self-service checkout system which can process RFID-equipped products.

It is another object of the present invention to provide a self-service checkout system which can weigh RFID-equipped products for security purposes.

It is another object of the present invention to provide a self-service checkout system which can process products with and without RFID capability.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a perspective view of one example implementation of a self-service checkout system with RFID capability; and FIG. 3 is a flow diagram illustrating the operation of he self-service checkout system.

DETAILED DESCRIPTION

Figure 1:
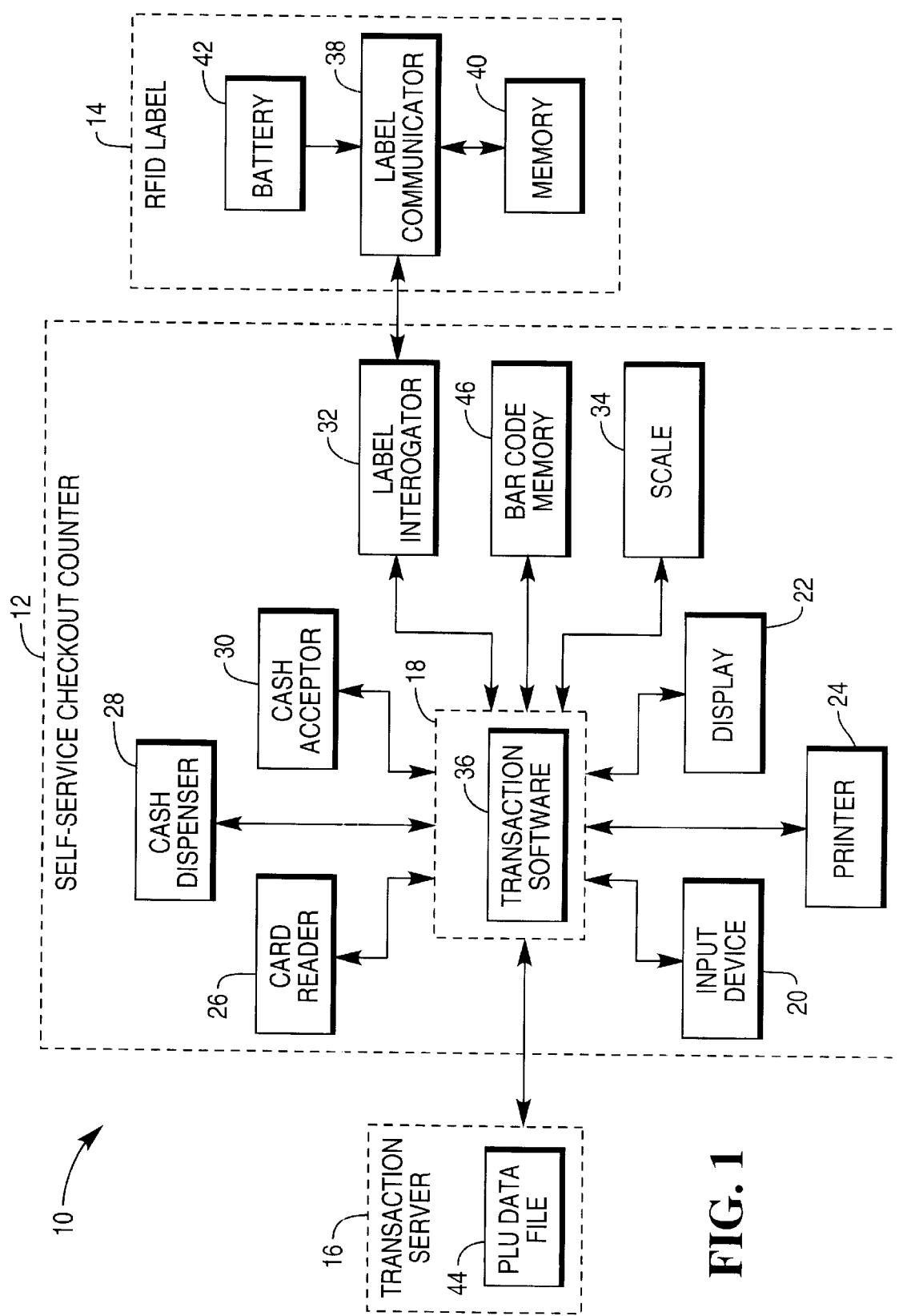
FIG. 1 is a block diagram of a transaction system with RFID capability.

Referring to FIG. 1, one embodiment of transaction system 10 includes self-service checkout counter 12, RFID label 14, and transaction server 16.

Self-service checkout counter 12 includes terminal 18, input device 20, display 22, printer 24, card reader 26, cash dispenser 28, cash acceptor 30, label interrogator 32, and scale 34.

Terminal 18 controls operation of self-service checkout counter 12 and executes transaction software 36.

Input device 20 records customer selections. Input device 20 may be a touch screen or keyboard.

Display 22 displays program instructions to assist the customer through a transaction. Display 22 may be a liquid crystal display and may be combined with input device 20 as a touch screen.

Printer 24 prints transaction information on receipt paper.

Card reader 26 reads information from customer payment and identification cards. Card reader 24 may include a magnetic stripe reader or smart card reader or combination of both.

Cash dispenser 28 provides change and extra cash.

Cash acceptor 30 accepts cash payments.

Label interrogator 32 interrogates RFID label 14 to determine a product identification number for a product associated with RFID label 14. Label interrogator 32 may include an RF transceiver. Label interrogator 32 may be located in several locations, depending upon the configuration of self-service checkout counter 12 and any corresponding security precautions.

Scale 34 determines weight of all products on scale 34 for security purposes.

Self-service checkout counter 12 may additionally include a barcode reader 46 to the extent that some items contain barcode labels instead of RFID labels 14.

RFID label 14 is an identification label. RFID label 14 may vary in size, depending upon product size, and may be visible or hidden when attached to a product. RFID label 14 may be removably or permanently attached to the product. RFID label 14 includes label communicator 38.

RFID label 14 may be an active or passive label. Active RFID labels may include RFID memory 40 and battery 42. Alternative power sources may be capacitive, inductive, or derive energy from radio waves. Label communicator 38 may include an RF transceiver.

Passive RFID labels use very little energy and may only include label communicator 38. Label communicator 38 may include a reflective antenna, such as a conductive ink antenna, which has a frequency which is unique among RFID labels.

If active, label communicator 38 sends item identification information stored in RFID memory 40 to label interrogator 32 in self-service checkout counter 12. If passive, label communicator 38 sends a unique signature which is compared to a table of item identifications to identify the associated product.

Memory 40 stores item identification information and may include a read-only memory (ROM).

Battery 42 provides power to label communicator 38.

Transaction server 16 receives item identification from terminal 18 and returns price and weight information from price look-up data file 44.

Turning now to FIG. 2, an example embodiment of self-checkout counter 12 is illustrated in detail.

Self-checkout counter 12 additionally includes counter 48, camera 56, and produce scale 58. Counter 48 includes working surfaces 50, which provide space for arranging or bagging purchased items. As such, working surfaces 50 include bag well 52.

Label interrogator 36 is preferably located near any working surface 50. In this embodiment, label interrogator 36 is shown in bag well 52. Also, one or more scales 34 are envisioned and they may be located under any of working surfaces 50 to monitor for product substitutions.

Camera 56 monitors customers during checkout. A store employee may monitor several self-service checkout counters 12 from a security desk.

Produce scale 58 provides weight information for produce items, if purchased.

Referring now to FIG. 3, the operation of transaction system 10 is illustrated in detail beginning with START 70.

In step 72, transaction software displays instructions to a customer using display 22 and waits for a response from the customer indicating that all labelled items have been placed on working surfaces 50, for example, all in bags 54. The customer enters the response using input device 20.

In step 74, transaction software 36 causes label interrogator 32 to communicate with RFID labels 14.

In step 76, transaction software 36 records responses from RFID labels 14. The responses include item identification information stored in memories 40.

Passive RFID labels may only provide identification information for themselves through unique combinations of reflected signals at certain frequencies. An extra step of cross-referencing RFID label identification information with item information would be required.

In step 78, transaction software 36 obtains price and weight information for each item identification number from transaction server 44.

In step 80, transaction software 36 tallies the weight information and obtains a weight reading from scale 34 to verify that no items have been substituted.

In step 82, transaction software 36 determines whether the tallied weight information is within a predetermined threshold of the weight reading obtained from scale 34. If so, operation proceeds to step 88. Otherwise, transaction operation proceeds to step 84.

In step 84, transaction software 36 displays an error message to the customer and may additionally contact a store employee from the security desk to assist the customer.

In step 88, transaction software 36 determines from customer input whether the customer wishes to process any non-barcoded items, such as produce items. If the customer has produce items, operation proceeds to step 90. Otherwise operation proceeds to step 92.

In step 90, transaction software 36 records weight information from produce scale 58 and records customer-entered produce identification information from input device 20.

Transaction software 36 may also process barcoded produce or other items using bar code reader 46 and verify processing in the manner of step 82 for RFID labeled items.

In step 92, transaction software 36 generates a total amount due, displays payment options, completes the payment process, and prints a receipt using printer 24.

In step 94, operation ends.

Although the present invention has been described with particular reference to certain preferred embodiments thereof, variations and modifications of the present invention can be effected within the spirit and scope of the following claims.

I claim:

1. A method of recording a product during a customer managed transaction comprising the steps of:

recording a customer indication that the product is on a security scale under a working surface of a self-service checkout counter;

determining actual weight information from the security scale;

transmitting a signal to an RFID label on the product while the product is on the security scale by a label interrogator located near the working surface;

recording a response from the RFID label;

obtaining identification information for the product using the response from the RFID label;

obtaining price and reference weight information for the product using the identification information;

comparing the actual weight information with the reference weight information; and initiating acceptance of payment if a difference amount between the actual weight information and the reference weight information is with a predetermined threshold.

2. A system for completing a customer managed transaction comprising:

an RFID label affixed to a product;

a security scale for determining actual weight information for the product while the product is located on a working surface of a self-service checkout counter;

an RFID label interrogator; and a computer which records a customer indication that the product is on the security scale, obtains the actual weight of the product from the security scale, causes the RFID label interrogator to transmit a signal to the RFID label while the product is on the security scale, records a response from the RFID label, obtains identification information for the product using the response from the RFID label, obtains price and reference weight information for the product using the identification information, compares the actual weight information with the reference weight information, and initiates acceptance of payment if a difference amount between the actual weight information and the reference weight information is with a predetermined threshold.

3. A system for completing a customer managed transaction comprising:

a self-service checkout counter including a working surface;

an RFID label affixed to a product;

a security scale for determining actual weight information for the product while the product is located on the working surface;

an RFID label interrogator near the working surface; and a computer which records a customer indication that the product is on the security scale, obtains the actual weight of the product from the security scale, causes the RFID label interrogator to transmit a signal to the RFID label while the product is on the security scale, records a response from the RFID label, obtains identification information for the product using the response from the RFID label, obtains price and reference weight information for the product using the identification information, compares the actual weight information with the reference weight information, and initiates acceptance of payment if a difference amount between the actual weight information and the reference weight information is with a predetermined threshold.

4. A system for completing a customer managed transaction comprising:

a self-service checkout counter including a bag well;

an RFID label affixed to a product;

a security scale for determining actual weight information for the product while the product is located in a bag in the bag well;

an RFID label interrogator near the bag well; and a computer which records a customer indication that the product is in the bag in the bag well, obtains the actual weight of the product from the security scale, causes the RFID label interrogator to transmit a signal to the RFID label while the product is in the bag in the bag well, records a response from the RFID label, obtains identification information for the product using the response from the RFID label, obtains price and reference weight information for the product using the identification information, compares the actual weight information with the reference weight information, and initiates acceptance of payment if a difference amount between the actual weight information and the reference weight information is with a predetermined threshold.

5. A method of recording a product during a customer managed transaction comprising the steps of:

recording a customer indication that the product is in a bag in a bag well of a self-service checkout counter;

determining an actual weight of the product in the bag by a security scale;

transmitting a signal to an RFID label on the product while the product is in the bag by a label interrogator located near the bag well;

recording a response from the RFID label;

obtaining identification information for the product using the response from the RFID label;

obtaining price and reference weight information for the product using the identification information;

comparing the actual weight information with the reference weight information; and initiating acceptance of payment if a difference amount between the actual weight information and the reference weight information is with a predetermined threshold.

* * * * *